United States Patent
Hayashi et al.

(10) Patent No.: US 10,270,701 B2
(45) Date of Patent: Apr. 23, 2019

(54) MANAGEMENT NODE, TERMINAL, COMMUNICATION SYSTEM, COMMUNICATION METHOD, AND PROGRAM STORAGE MEDIUM

(71) Applicant: NEC Corporation, Minato-ku, Tokyo (JP)

(72) Inventors: Yuki Hayashi, Tokyo (JP); Jun Suzuki, Tokyo (JP); Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/528,800

(22) PCT Filed: Dec. 2, 2015

(86) PCT No.: PCT/JP2015/005986
§ 371 (c)(1),
(2) Date: May 23, 2017

(87) PCT Pub. No.: WO2016/088371
PCT Pub. Date: Jun. 9, 2016

(65) Prior Publication Data
US 2017/0324670 A1    Nov. 9, 2017

(30) Foreign Application Priority Data

Dec. 5, 2014  (JP) ................................ 2014-246505

(51) Int. Cl.
*H04L 12/813* (2013.01)
*H04L 12/825* (2013.01)
(Continued)

(52) U.S. Cl.
CPC ............. *H04L 47/25* (2013.01); *H04L 12/44* (2013.01); *H04L 41/12* (2013.01); *H04L 47/20* (2013.01); *H04L 43/0894* (2013.01)

(58) Field of Classification Search
CPC ......... H04L 41/00; H04L 41/12; H04L 47/00; H04L 47/20; H04L 47/22; H04L 47/25; H04L 12/00; H04L 45/00
See application file for complete search history.

(56) References Cited

U.S. PATENT DOCUMENTS 6,449,650 B1 *  9/2002  Westfall .............. H04L 12/5601
                                                    709/227
6,721,797 B1 *  4/2004  Kim .................... H04L 12/5602
                                                    709/223
(Continued)

FOREIGN PATENT DOCUMENTS

JP    2002-185459 A    6/2002
JP    2004-266389 A    9/2004
(Continued)

OTHER PUBLICATIONS

International Search Report for PCT Application No. PCT/JP2015/005986, dated Feb. 9, 2016.
(Continued)

*Primary Examiner* — Mohamed A Kamara

(57) ABSTRACT

Disclosed are a management node and the like for enabling packets to be efficiently sent to a plurality of destination terminals, while preventing the increase of implementation scale of network interface cards (NIC). The management node includes: a rule determination means for determining a prescribed rule for distributing packets to a plurality of rate control means included in the network interface cards (NIC) provided to the terminals; and a rule sending means for sending the determined prescribed rule to the terminals.

8 Claims, 18 Drawing Sheets

(51) Int. Cl.
*H04L 12/44* (2006.01)
*H04L 12/24* (2006.01)
*H04L 12/26* (2006.01)

(56) References Cited

U.S. PATENT DOCUMENTS

| | | |
|---|---|---|
| 2006/0146708 A1 | 7/2006 | Kanazawa |
| 2007/0008971 A1* | 1/2007 | Li .......................... H04L 45/00 370/392 |
| 2009/0268611 A1* | 10/2009 | Persson .................. H04L 47/10 370/230 |
| 2010/0226251 A1* | 9/2010 | Imai ....................... H04L 45/00 370/235 |
| 2012/0188874 A1 | 7/2012 | Kumagai et al. |
| 2014/0365703 A1* | 12/2014 | Yamaguchi ......... H04L 12/4013 710/306 |
| 2015/0172193 A1* | 6/2015 | Sinha ..................... H04L 47/12 370/230 |

FOREIGN PATENT DOCUMENTS

| | | |
|---|---|---|
| JP | 2013-034164 A | 2/2013 |
| WO | 2014/141692 A1 | 9/2014 |

OTHER PUBLICATIONS

English translation of Written opinion for PCT Application No. PCT/JP2015/005986.

* cited by examiner

Fig. 6

| DESTINATION ID | LINK TO PASS | AVAILABLE SENDING RATE | etc |
|---|---|---|---|
| 1 | {L_1, ...} | $X_1$[Mbps] | * |
| 2 | {L_2, ...} | $X_2$[Mbps] | * |
| ... | ... | ... | ... |
| N | {L_N, ...} | $X_N$[Mbps] | * |
| | | NUMBER OF RATE CONTROL UNITS | M UNITS |

Fig. 7

| RATE CONTROL UNIT | SENDING RATE | DESTINATION GROUP |
|---|---|---|
| 1 | $Y_1$[Mbps] | {*,*,*, ...} |
| 2 | $Y_2$[Mbps] | {*,*,*, ...} |
| ... | ... | ... |
| M | $Y_M$[Mbps] | {*,*,*, ...} |

MANAGEMENT NODE, TERMINAL, COMMUNICATION SYSTEM, COMMUNICATION METHOD, AND PROGRAM STORAGE MEDIUM

This application is a National Stage Entry of PCT/JP2015/005986 filed on Dec. 2, 2015, which claims priority from Japanese Patent Application 2014-246505 filed on Dec. 5, 2014, the contents of all of which are incorporated herein by reference, in their entirety.

TECHNICAL FIELD

The present invention relates to a management node, a terminal, a communication system, a communication method, and a program storage medium. In particular, the present invention relates to a terminal provided with a network interface card (NIC), a management node that manages the terminal, a communication system including the terminal and the management node, a communication method, a program storage medium and the like.

BACKGROUND ART

For a hardware (HW) of a network interface card (NIC), a device that is provided with a network congestion control function have emerged in recent years for the purposes of offloading a load of a CPU (Central Processing Unit) and controlling sending and receiving of data with a high degree of accuracy. The NIC provided with above function is capable of compensating for reduction in CPU performance associated with power saving in the device and controlling sending and receiving of data with a high degree of accuracy in a broadband and low-delay local area network (LAN) such as a data center.

The NICs provide functions such as end-to-end congestion control for each flow and rate shaping. The functions have been originally performed in a software stack (mainly in the Transmission Control Protocol/Internet Protocol (TCP/IP) layer) of an operating system (OS), as hardware functions.

FIGS. 16, 17 and 18 are block diagrams illustrating configurations of a communication system, a terminal, and an NIC provided in the terminal according to a related art. Referring to FIG. 16, the communication system includes terminals 101-1 to 101-N and a network 2. In the following description, suffixes on reference numerals of each circuitry and software, such as "-1" to "-N" and "-1" to "-(N−1)," will sometimes be omitted.

Referring to FIG. 17, a terminal 101 includes, as software (SW) components, an application 4 for sending and receiving data and a device driver 6 for causing a device to operate. In addition, the terminal 101 includes, as hardware (HW) components, a CPU 7, a memory 8, a root complex 9, and an NIC 105 for sending and receiving data.

Referring to FIG. 4, the device driver 6 includes a memory region (MEM region) 10 and a direct memory access control (DMACTL) unit 11. The MEM region 10 holds data coming from the application 4 in association with each destination identifier (ID). The DMACTL unit 11 controls a DMA unit 112 in the NIC 105.

Referring to FIG. 18, the NIC 105 includes a direct memory access (DMA) unit 112, rate control units 114-1 to 114-(N−1), and a network interface (NW I/F) 115. The DMA unit 112 retrieves required data from the memory 8 of the terminal 101. Each of the rate control units 114-1 to 114-(N−1) controls a sending rate at which data destined for each destination ID are sent out to the network. The network interface 115 is an interface for connecting to the network 2. Each rate control unit 114 includes a buffer 117 for holding data until a data transmission opportunity arises and a rate control timer 118 which controls data transmission opportunities.

The communication system according to the related art that has the configuration described above operates as follows.

The application 4 in the terminal 101 sends data to be sent to each destination ID to the device driver 6. Then, the device driver 6 saves the received data in the memory region 10 in association with each destination ID.

When any of the buffers 117-1 to 117-(N−1) (for example, the buffer 117-1) in the rate control units 114-1 to 114-(N−1) is freed, the DMA unit 112 in the NIC 105 issues a DMA request to the memory region 10 of a destination ID corresponding to the buffer 117-1 among the memory regions 10 in the device driver 6. The device driver 6 sends data in the memory region 10 associated with the destination ID to the requested buffer 117-1 in response to a completion responding to the DMA request.

Further, when any of the rate control timers 118-1 to 118-(N−1) in the rate control units 114-1 to 114-(N−1) is expired, the rate control timer extracts data from the buffers 117-1 to 117-(N−1) connected to the rate control timer and sends the data to the network 2 through the NW I/F 115. Then, the rate control timers 118-1 to 118-(N−1) in the rate control units 114-1 to 114-(N−1) activate rate control timers on the basis of a sending rate set therein.

In this way, the NIC 105 which provides a rate control function as hardware can perform rate control for each destination terminal by including the buffer 117 and the rate control timer 118 inside for each destination ID. This enables control with a higher degree of accuracy than control performed by the CPU 7 while reducing a load on the CPU 7.

HW that has the function as described above is disclosed in PTL 1 and PTL 2, for example. PTL 1 describes a technique of holding data destined for each destination ID in the same First-In First-Out (FIFO) queue with the aim of simplifying a configuration, and then sending out the data to a network. PTL 2 describes a technique of holding data destined for destination IDs in the respective FIFO queues and further controlling a rate control timer associated with each of classes categorized into different destination IDs.

CITATION LIST

Patent Literature

PTL 1: Japanese Patent Application Laid-open Publication No. 2002-185459
PTL 2: Japanese Patent Application Laid-open Publication No. 2004-266389

SUMMARY OF INVENTION

Technical Problem

The techniques disclosed in PTLs 1 and 2 have the following problems. The following analysis has been made by the present inventors.

Since only a single FIFO queue is provided in the configuration described in PTL 1, Head of Line Blocking (hereinafter referred to as "HoL Blocking") occurs where transmission to a destination ID is not performed, so that transmission to another destination ID is held up. When HoL Blocking occurs, usually a communication bandwidth cannot be effectively used.

On the other hand, PTL 2 solves the problem of PTL 1 described above by holding, as in the configuration described above, data in FIFO queues associated with respective destination IDs and controlling the rate control timer for each of classes categorized into different destination IDs. However, using the configuration as in PTL 2 requires provision of buffers for respective destination IDs in HW implementation in the NIC. Each buffer requires a capacity that accommodates at least one transmission unit (for example, one Ethernet frame in the case of the Ethernet (registered trademark)). Therefore, there is a problem that HW implementation becomes difficult as the number of destination IDs increases.

As described above, using the same FIFO queue for respective destination IDs as in the terminal described in PTL 1 has a problem of low network utilization efficiency. This is because, when the same FIFO queue is used for respective destination IDs, HoL Blocking may occur and a case may occur that data being otherwise possible to be sent to a destination ID cannot be sent.

Further, the terminal described in PTL 2 has a problem that an implementation size increases in proportion to the number of destination IDs and therefore HW implementation becomes difficult. This is because as many memories for buffers and control clocks for rate control timer in implementing HW as the number of destination IDs need to be held since a rate control unit, and its internal buffer and rate control timer need to be provided for each destination ID.

Therefore, there is a problem of enabling packets to be efficiently sent to a plurality of destination terminals while preventing an increase of an implementation size of an NIC. An object of the present invention is to provide a management node, a terminal, a communication system, a communication method, and a program storage medium that contribute to solving the problem.

Solution to Problem

According to a first aspect of the present invention, a management node including rule determination means for determining a prescribed rule for distributing packets to a plurality of rate control means included in a network interface card (NIC) provided in a terminal is provided. The management node also includes rule sending means for sending the determined prescribed rule to the terminal.

According to a second aspect of the present invention, a terminal including a network interface card (NIC) is provided. The NIC includes a plurality of rate control means for controlling sending rates of packets. The NIC includes destination distribution means for distributing packets to the plurality of rate control means in accordance with a prescribed rule determined by a management node.

According to a third aspect of the present invention, a communication system including a terminal including a network interface card (NIC) and a management node which controls the NIC is provided. The NIC includes a plurality of rate control means for controlling sending rates of packets. The NIC includes destination distribution means for distributing packets to the plurality of rate control means in accordance with a prescribed rule determined by the management node.

According to a fourth aspect of the present invention, a communication method by a management node is provided. The communication method determines, by the management node, a prescribed rule for distributing packets to a plurality of rate control means included in a network interface card (NIC) provided in a terminal. The communication method sends, by the management node, the determined prescribed rule to the terminal.

According to a fifth aspect of the present invention, non-transitory computer-readable storage medium storing a program causing a computer provided in a management node which manages a terminal is provided. The program storage medium stores a program causing a computer to perform a process of determining a prescribed rule for distributing packets to a plurality of rate control means included in a network interface card (NIC) provided in the terminal. The program storage medium stores the program causing a computer to perform a process of sending the determined prescribed rule to the terminal.

Note that the object given above may also be achieved by a computer program that implements a communication method with the configurations described above by a computer.

Advantageous Effects of Invention

The management node, the terminal, the communication system, the communication method, and the program storage medium according to the present invention enable packets to be efficiently sent to a plurality of destination terminals while preventing an increase of an implementation size of an NIC.

BRIEF DESCRIPTION OF DRAWINGS

FIG. 6 is a table illustrating example structures of information input to a management node in the communication system according to the first example embodiment.

FIG. 7 is a table illustrating example configurations of distribution rules output from the management node in the communication system according to the first example embodiment.

DESCRIPTION OF EMBODIMENTS

Figure 1:
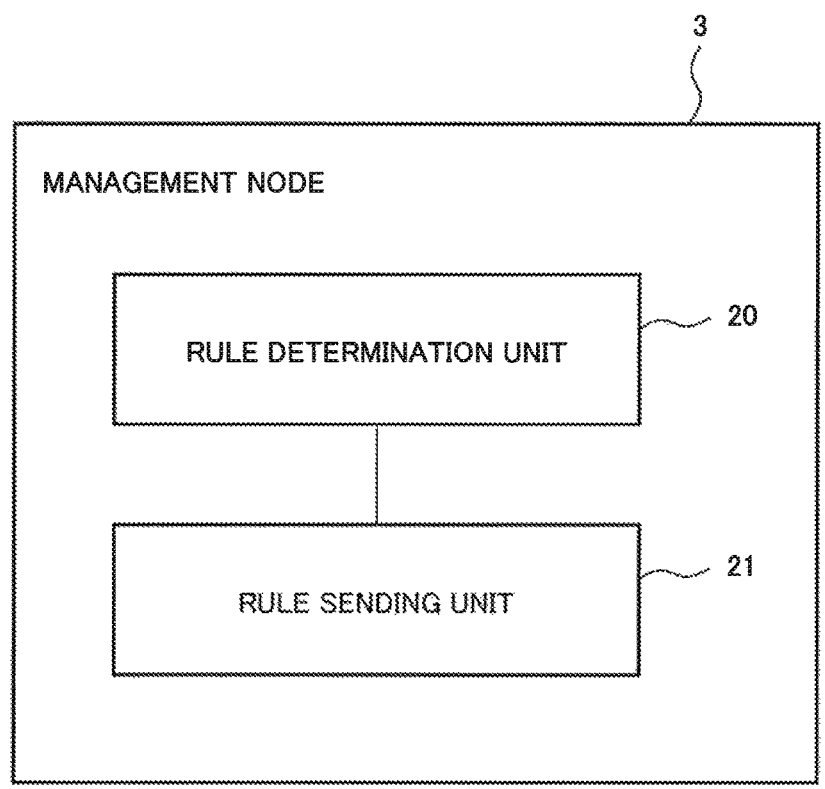
FIG. 1 is a block diagram illustrating an example configuration of a management node according to one example embodiment.

An overview of one example embodiment will be given first. Note that reference numerals in the overview are given for illustration only to help understanding of the present invention and are not intended to limit the present invention to the example embodiments illustrated.

FIG. 1 is a block diagram illustrating an example configuration of a management node 3 according to one example embodiment. Referring to FIG. 1, the management node 3 includes a rule determination unit 20 and a rule sending unit 21. The rule determination unit 20 determines prescribed rules for distributing packets among a plurality of rate control units included in a network interface card (NIC) provided in a terminal. The rule sending unit 21 sends the determined prescribed rules to the terminal.

Figure 2:
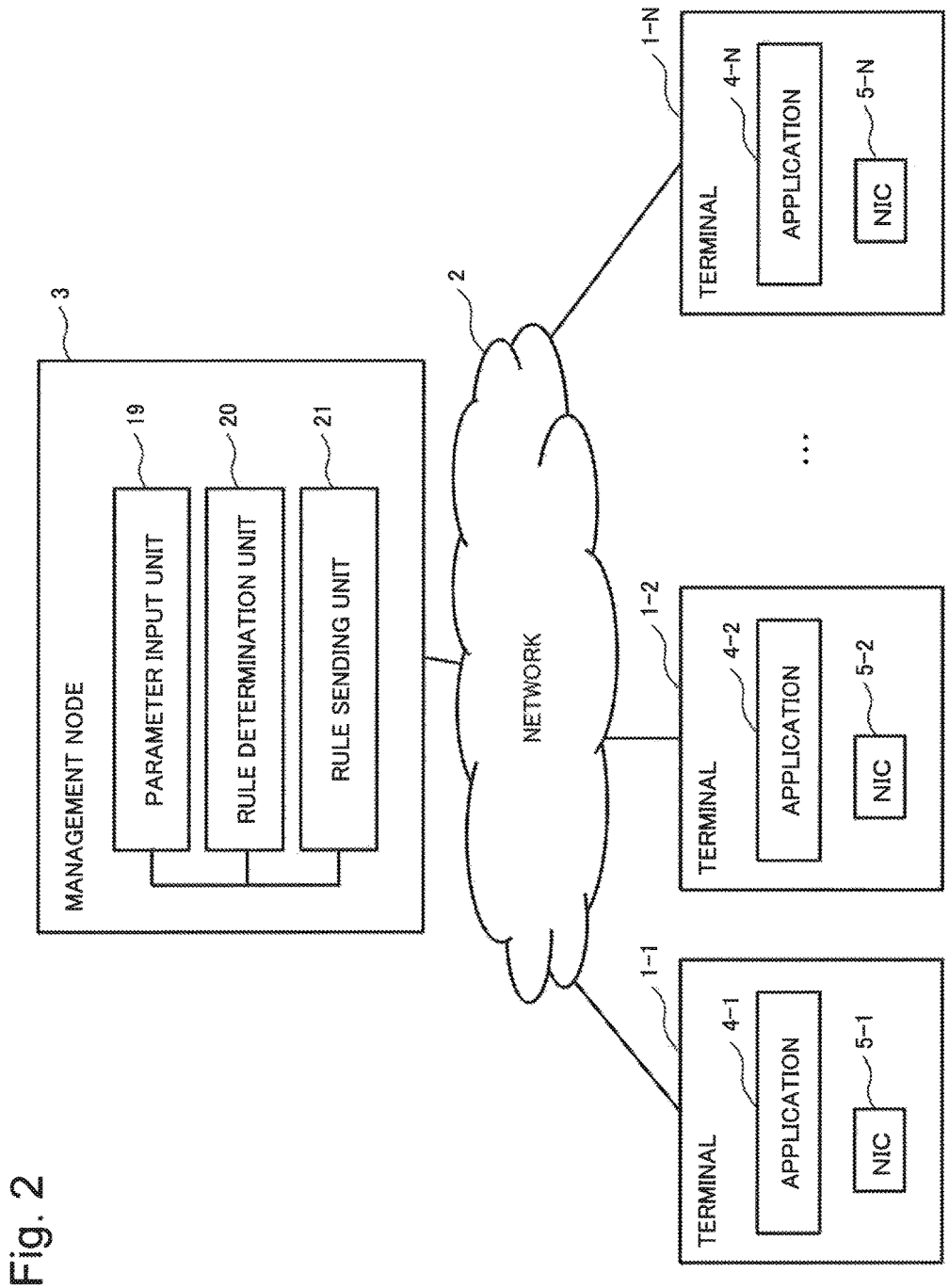
FIG. 2 is a block diagram illustrating an example configuration of a communication system according to a first example embodiment.
Figure 5:
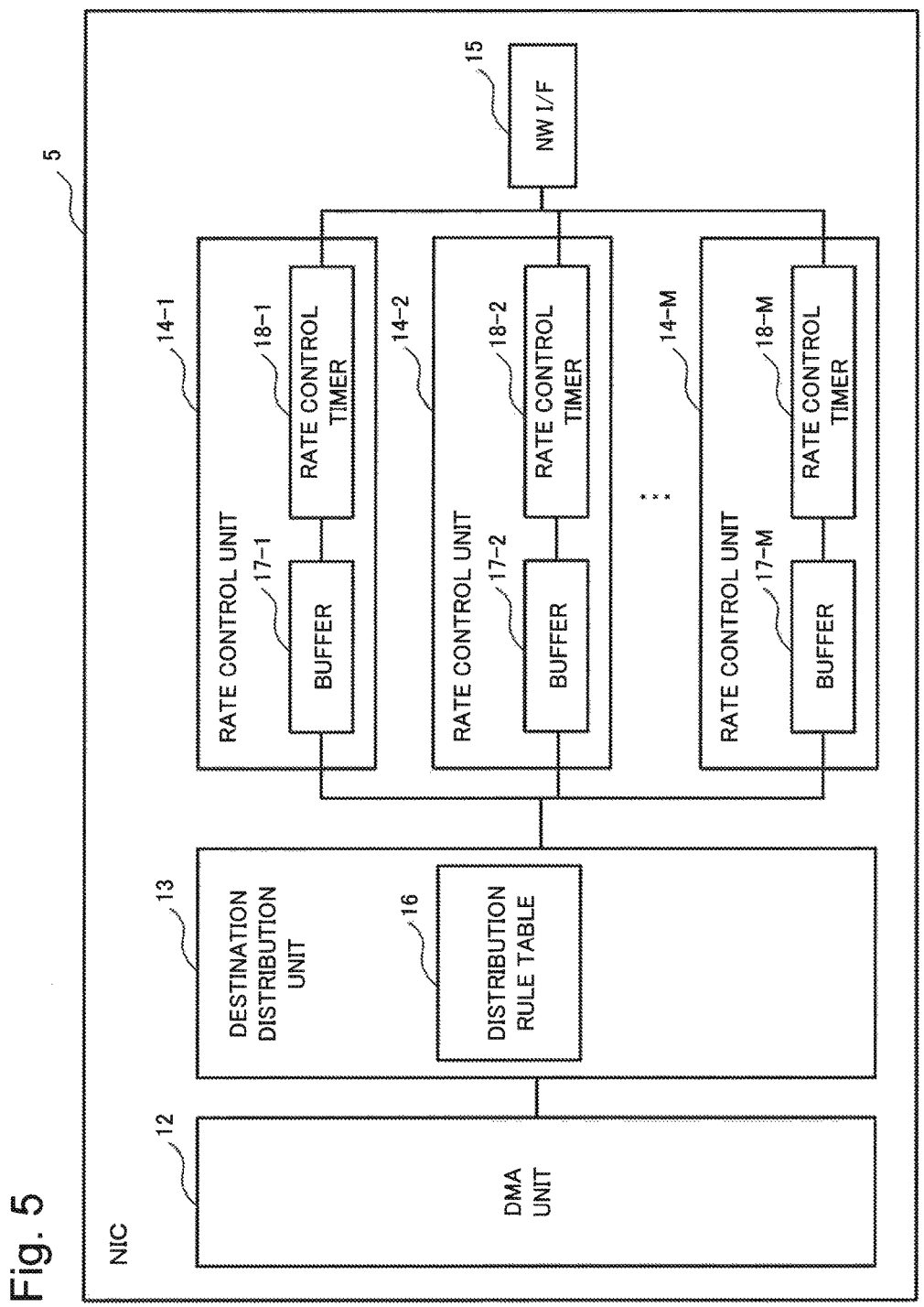
FIG. 5 is a block diagram illustrating an example configuration of a network interface card (NIC) in the communication system according to the first example embodiment.

FIG. 2 is a block diagram illustrating an example configuration of a communication system including a management node 3. Unlike the management node 3 illustrated in FIG. 1, the management node 3 in FIG. 2 includes a parameter input unit 19. FIG. 5 is a block diagram illustrating an example configuration of an NIC 5 provided in a terminal 1 in FIG. 2. A rule determination unit 20 may determine prescribed rules for associating packets with any of a plurality of rate control units 14-1 to 14-M according to destination terminals, on the basis of the number (M in FIG. 5) of the plurality of rate control units 14-1 to 14-M. The rule determination unit 20 may also determine prescribed rules on the basis of the topology of a network 2 connected to the NIC 5. The network topology may include information about a link through which packets pass when the packet is sent from a terminal (for example, terminal 1-1) to a destination terminal (for example, terminal 1-N) pass. Further, the rule determination unit 20 may determine prescribed rules on the basis of information about a flow of packets sent out from a terminal 1. The flow information may include information about an available transmission bandwidth for packets sent from a terminal (for example, terminal 1-1) to a destination terminal (for example, terminal 1-N).

The management node 3 described above can efficiently send out packets to a plurality of destination terminals while preventing an increase of the implementation size of the NIC 5. The reasons are as follow. Since a rate control unit 14 can be shared among pieces of data to be sent to a plurality of destination terminals, the need for providing rate control units 14 for the respective destination terminals is eliminated. Further, since an NIC 5 includes a plurality of rate control units 14, HoL Blocking is less likely to occur.

One example embodiment will be described further with reference to drawings. In the following description, suffixes on reference numerals of circuitry and software, such as "-1" to "-N" and "-1" to "-M" will sometimes be omitted. Referring to FIG. 5, an NIC 5 provided in a terminal 1 includes a plurality of rate control units 14 (14-1 to 14-M), a destination distribution unit 13, a DMA unit 12, and a NW I/F 15. Each of the rate control units 14-1 to 14-M collectively controls the rate of data destined for a plurality of destination IDs. The destination distribution unit 13 selects a rate control unit 14 to which each piece of data destined for a plurality of destination IDs is to be passed. Referring to FIG. 2, a management node 3 includes a rule determination unit 20 which determines distribution rules for the destination distribution unit 13.

The rate control unit 14-1 holds data destined for a plurality of destination IDs in a single buffer 17-1 and causes a rate control timer 18-1 to operate in accordance with a sending rate notified from the route determination unit 20. The other rate control units 14-2 to 14-M operate in the same way. Fewer (M) rate control units 14 than the number of destination IDs are implemented. The destination distribution unit 13 holds distribution rules within itself and refers to the destination ID of data arriving from the DMA unit 12 to determine to which rate control unit 14 the data is to be distributed. The destination distribution unit 13 updates itself with a distribution rule provided from the rule determination unit 20 and notices the rule determination unit 20 of the updating. The rule determination unit 20 receives a network topology input into itself, flow information generated at each terminal 1, and information such as information about the number of rate control units 14 held by the NIC 5 in each terminal 1 from the parameter input unit 19. The rule determination unit 20 uses the information received from the parameter input unit 19 to determine a distribution rule and notifies the determined distribution rule to the destination distribution unit 13 through the rule sending unit 21.

The communication system described above eliminates the need for holding a rate control unit 14 for each destination ID of data generated by the terminal 1 and therefore can prevent an increase in the HW size of the NIC 5. This is because the destination distribution unit 13 determines which rate control unit 14 is to be used for pieces of data destined for a plurality of destination IDs and distributes the data to the rate control unit 14, so that the single rate control unit can be shared among the pieces of data destined for the plurality of destination IDs.

Further, the communication system described above has the advantageous effect of making Hol Blocking in the terminal 1 less likely to occur. The reasons are as follows. Since a plurality of rate control units 14 are used instead of only a single rate control unit 14, an implementation that reduces the possibility of HoL Blocking is possible. In addition, by using the rule determination unit 20 to distribute data destined for destination IDs with available sending rates that are close to one another to the same rate control unit 14, for example, the possibility of HoL Blocking can be minimized in an implementation with a limited number of rate control units.

<First Example Embodiment>
[Configuration]

A communication system according to a first example embodiment will be described in detail next with reference to drawings.

FIG. 2 is a block diagram illustrating an example configuration of a communication system of the present example embodiment. Referring to FIG. 2, the communication system of the present example embodiment includes terminals 1-1 to 1-N and a management node 3 connected via a network 2.

Each of the terminals 1-1 to 1-N includes applications 4-1 to 4-N and network interface cards (NICs) 5-1 to 5-N which are interfaces for sending data to the network 2. The NICs 5-1 to 5-N are connected via the network 2.

The management node 3 changes and controls parameters for the NIC 5 of each terminal 1. The management node 3 includes a parameter input unit 19, a rule determination unit 20 and a rule sending unit 21. The parameter input unit 19 inputs a parameter into the management node 3. The rule determination unit 20 determines distribution rules on the basis of data from the parameter input unit 19 of the management node 3. The rule sending unit 21 sends the distribution rules determined by the rule determination unit 20 to the terminals 1-1 to 1-N.

Figure 3:
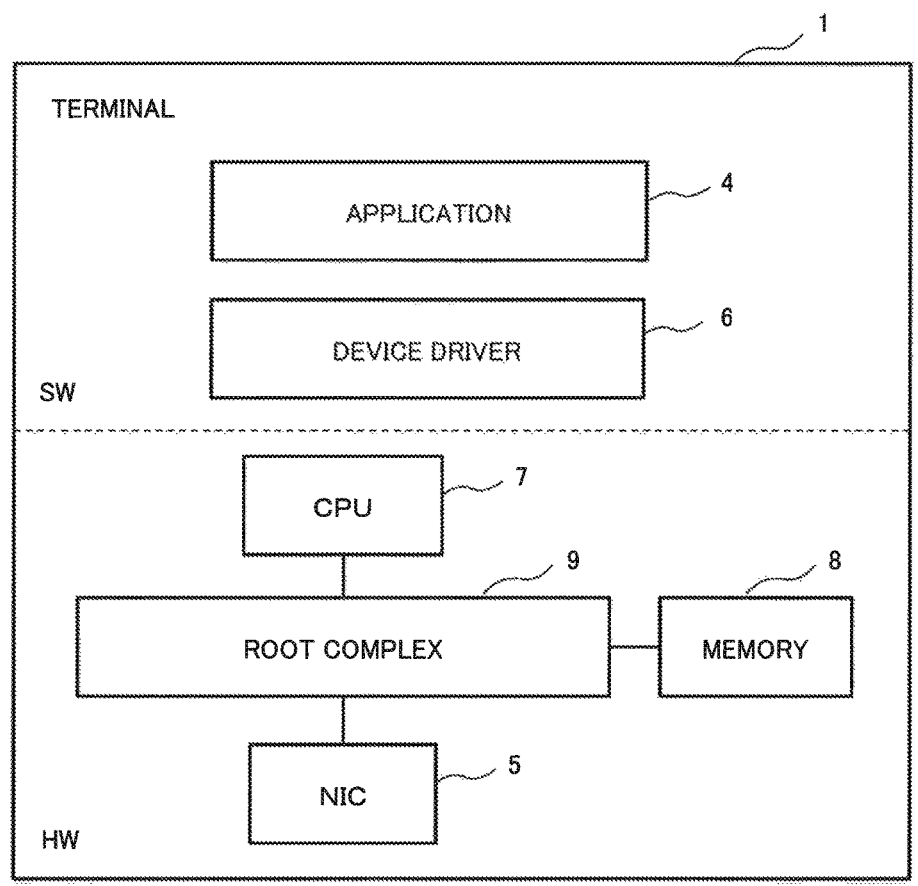
FIG. 3 is a block diagram illustrating an example configuration of a terminal in the communication system according to the first example embodiment.

FIG. 3 is a block diagram illustrating an example configuration of a terminal 1 in the present example embodiment. Referring to FIG. 3, the terminal 1 includes an application 4, a device driver 6 which controls an NIC 5, a CPU 7, a memory 8, a root complex 9, and the NIC 5.

Figure 4:
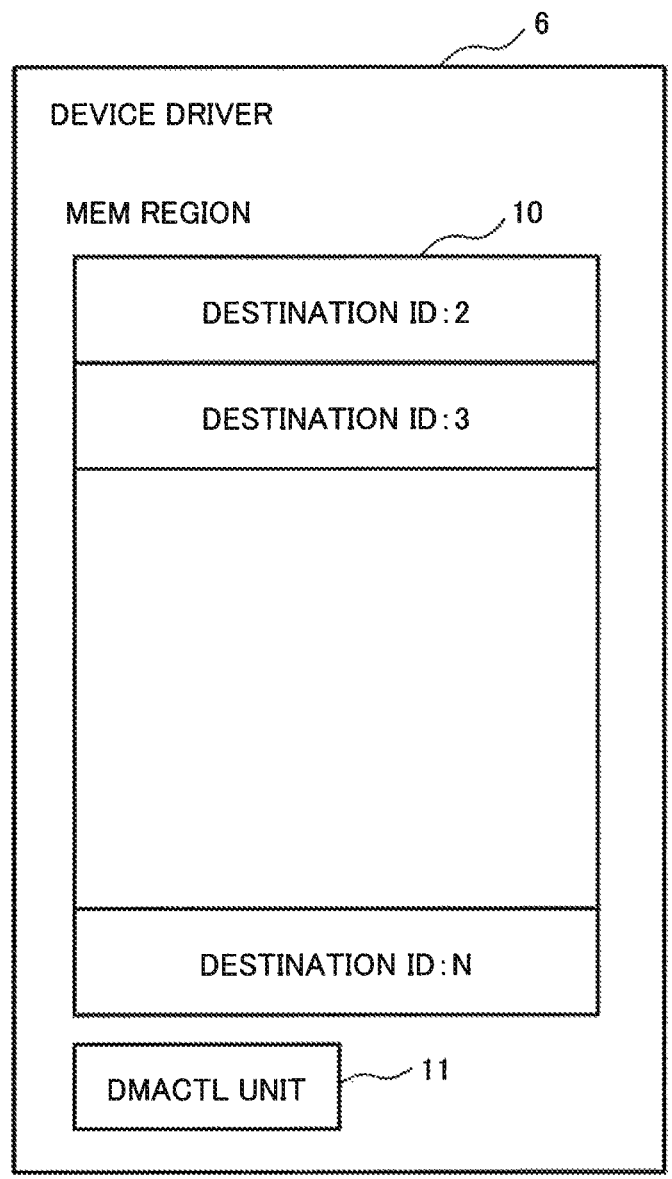
FIG. 4 is a block diagram illustrating a configuration of a device driver for implementing a communication system of a related art and the present invention.

FIG. 4 is a block diagram illustrating an example configuration of the device driver 6 of the terminal 1. Referring to FIG. 4, the device driver 6 includes a memory (MEM) region 10 and a direct memory access control (DMACTL) unit 11. The memory region 10 is a region for holding data generated by the application 4 in association with each destination of the data. The DMACTL unit 11 controls a DMA unit 12 in the NIC 5.

FIG. 5 is a block diagram illustrating an example configuration of an NIC 5 according to the present example embodiment. Referring to FIG. 5, the NIC 5 includes a DMA unit 12, a destination distribution unit 13, rate control units 14-1 to 14-M, and a network interface (NW I/F) 15.

The DMA unit 12 retrieves data from the memory 8 of the terminal 1 to the NIC 5. The destination distribution unit 13 refers to the destination of a packet that has arrived at the NIC 5 and determines a rate control unit 14 to which the incoming packet is to be distributed. Each of the rate control units 14-1 to 14-M controls a sending rate at which packets are output to the network 2. The NW I/F 15 is an interface for sending data to the network 2.

The destination distribution unit 13 includes a distribution rule table 16 that holds rules for distributing destinations. The rate control unit 14 further includes a buffer 17 for queueing packets until they gain a transmission opportunity and a rate control timer 18 which controls the timing of a transmission opportunity.

FIG. 6 is a table illustrating example parameters that the parameter input unit 19 of the management node 3 illustrated in FIG. 2 accepts. Referring to FIG. 6, the input information to be input into the management node 3 includes the destination ID of each node, the link through which data sent to the destination ID passes, an available sending rate at which the data sent to the destination ID can be sent, the number of rate control units 14 provided in the NIC 5 of each terminal 1, and the like. The input information may include information about a network topology and the like as other information. The input information preferably includes the number of rate control units 14 in addition to information about transmission of packets generated by each terminal 1 to the management node 3 and information for indicating topology information and the like to the management node 3.

FIG. 7 is a table illustrating example distribution rules output from the management node 3 and stored in the distribution rule table 16 of the NIC 5 illustrated in FIG. 5. Referring to FIG. 7, the distribution rules output from the management node 3 includes identifiers (for example, numbers) of the rate control units 14, sending rates to be set for the rate control units 14, and groups of destination IDs distributed to the rate control units 14. The destination distribution unit 13 refers to the group information and the destination ID of a packet that has arrived at the destination distribution unit 13 to determine a rate control unit 14 to which the incoming packet is to be distributed.

[Operation]

An operation of the terminal 1 and an operation of the management node 3 according to the present example embodiment will be described in detail with reference to flowcharts in FIGS. 8 to 11 and FIG. 14, an example of network topology illustrated in FIG. 12, and a process for generating a distribution rule from input information illustrated in FIG. 13.

An operation performed by the terminal 1 when sending packets will be described first.

Figure 8:
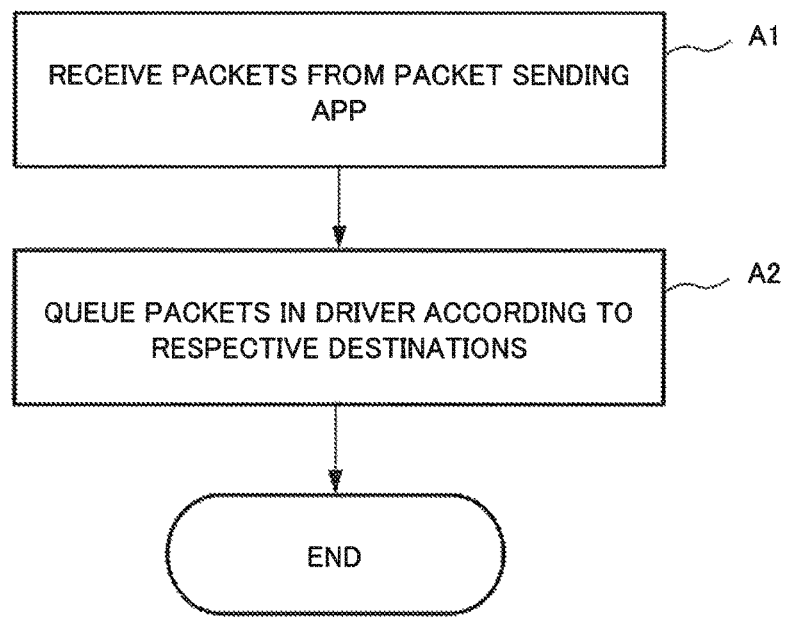
FIG. 8 is a flowchart illustrating an example operation of a device driver in the communication system according to the first example embodiment.

Referring to FIG. 8, when the device driver 6 receives packets from an application (APP) 4 (step A1), the device driver 6 queues the received packets into an appropriate buffer in the MEM region 10 in the device driver 6 that is associated with each destination ID of the received packets (step A2).

Figure 9:
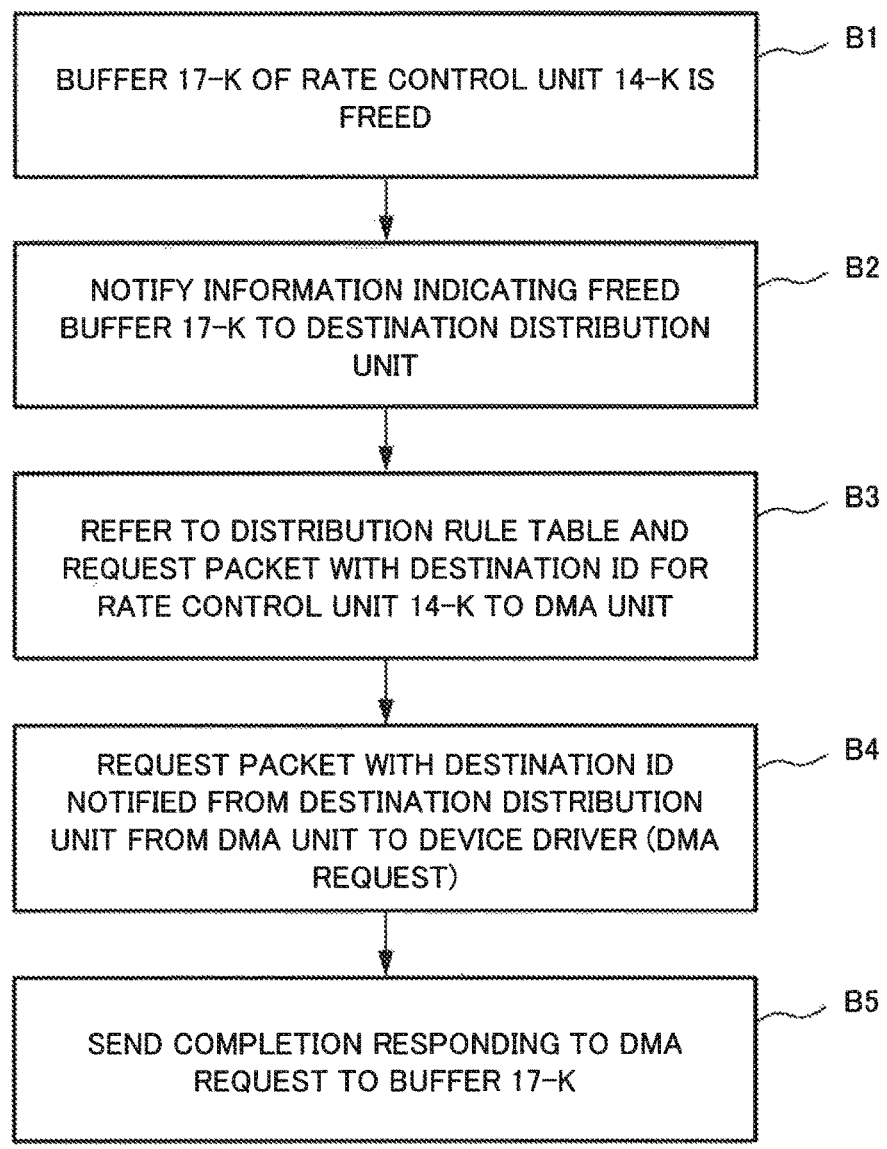
FIG. 9 is a flowchart illustrating an example operation of a rate control unit in the communication system according to the first example embodiment.

Referring to FIG. 9, when a buffer 17 (for example, a buffer 17-K) of any of rate control units 14 (for example, a rate control unit 14-K) in the NIC 5 is freed (step B1), the rate control unit 14 notifies information indicating that the buffer 17-K is freed to the destination distribution unit 13 (step B2).

The destination distribution unit 13 which has received the information indicating that the buffer 17-K is freed refers to the distribution rule table 16 to identify a packet having a destination ID associated with the freed rate control unit 14-K and notifies the packet having the destination ID to the DMA unit 12 (step B3). When a plurality of destination IDs are selected as the destination IDs in the distribution rule table 16, the destination distribution unit 13 selects IDs from the plurality of destination IDs in order.

Then, the DMA unit 12 which has received the notification sends a DMA request message for requesting the packet having the destination ID notified from the destination distribution unit 13 to the device driver 6 (step B4).

The device driver 6 which has received the DMA request message sends a DMA completion message containing the packet having the destination ID to the DMA unit 12 as the response to the request message. The DMA unit 12 which has received the DMA completion message sends the data in the massage to the freed buffer 17-K to fill the buffer 17-K in a first-in-first-out (FIFO) order (step B5).

Figure 10:
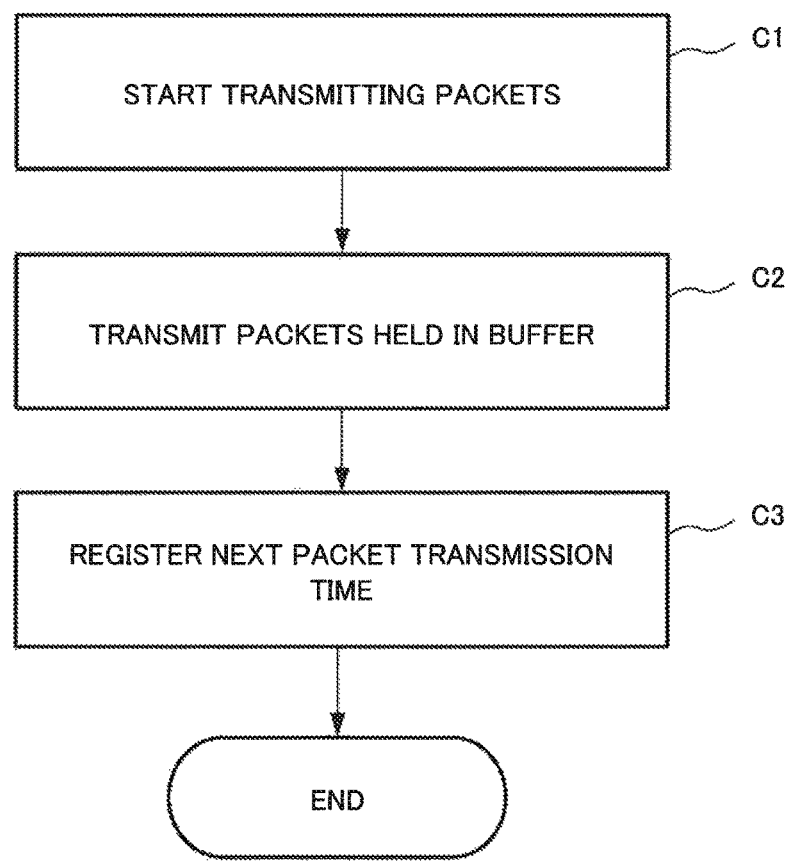
FIG. 10 is a flowchart illustrating an example operation of a destination distribution unit in the communication system according to the first example embodiment when sending data.

Referring to FIG. 10, when the rate control timer 18 gains a transmission opportunity, the rate control unit 14 starts packet transmission (step C1). Specifically, the rate control unit 14 retrieves a packet from the buffer 17 in the rate control unit and sends the retrieved packet to the network 2 (step C2).

Then, the rate control timer 18 registers the next packet transmission time (step C3). At this point, the rate control timer 18 divides the "size of the sent packet" by the "bandwidth set in the rate control unit 14" to calculate the next transmission time.

An operation performed by the management node 3 for changing a setting in the distribution rule table 16 of the NIC 5 in a terminal 1 will be described next.

Figure 11:
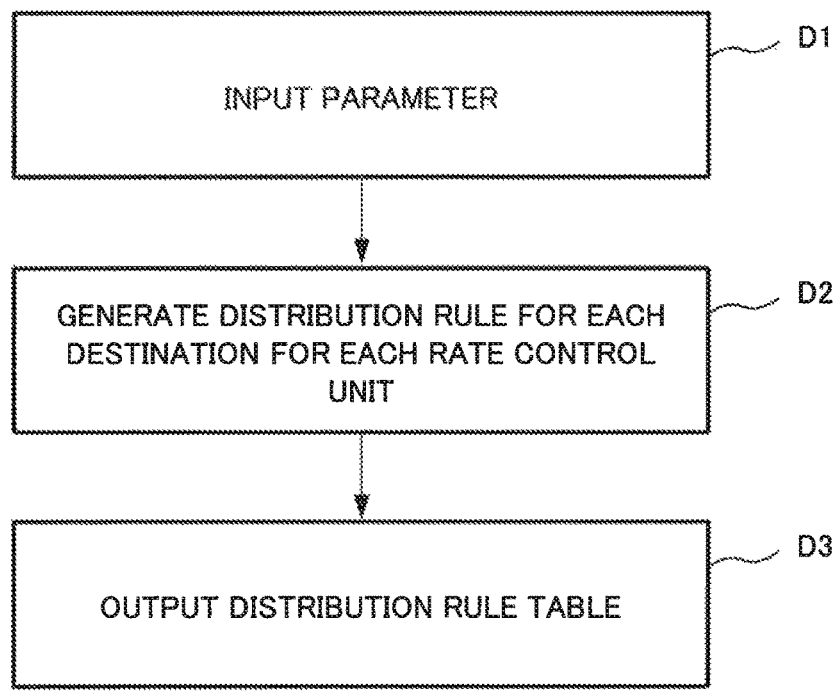
FIG. 11 is a flowchart illustrating an example operation of the management node in the communication system according to the first example embodiment of the present invention.

Referring to FIG. 11, the parameter input unit 19 of the management node 3 accepts destination information including a network topology, communication generated by a terminal 1 and the like (step D1). As an input method herein, a method of inputting the destination information directly to the management node 3 by a user, a method of sending the information to the management node 3 as control information by each terminal 1 or the like is considered, for example.

Figure 12:
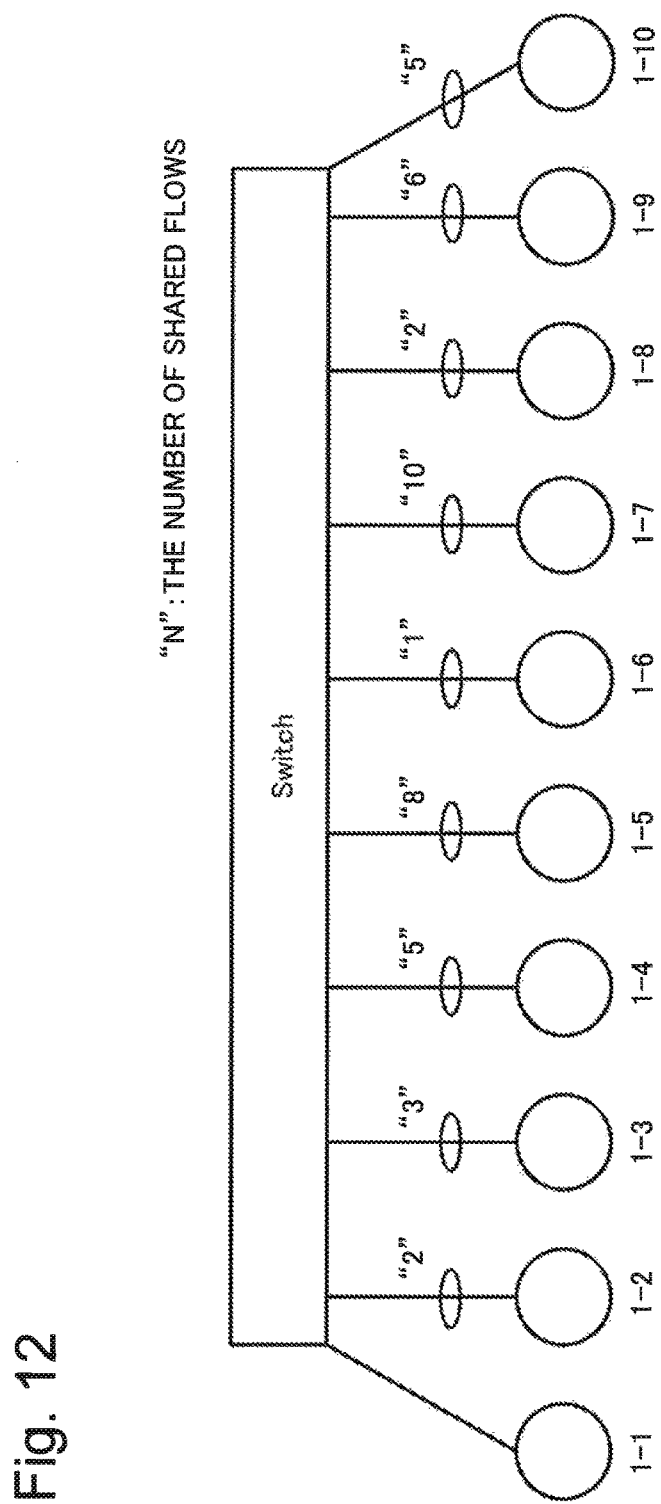
FIG. 12 is a diagram illustrating an example topology of a network in the communication system according to the first example embodiment.

As an example, consider a network topology illustrated in FIG. 12. FIG. 12 illustrates a network topology to which terminals 1-1 to 1-10 are communicatively connected through a switch. Each of the numeric values added to the links in FIG. 12 represents the number of shared flows passing through the link during transmission to the terminal 1-2 to 1-10, viewed from a terminal 1-1. For example, when the terminal 1-1 sends packets to the terminal 1-2, the packets pass through a link having the number of shared flows of two.

Figure 13:
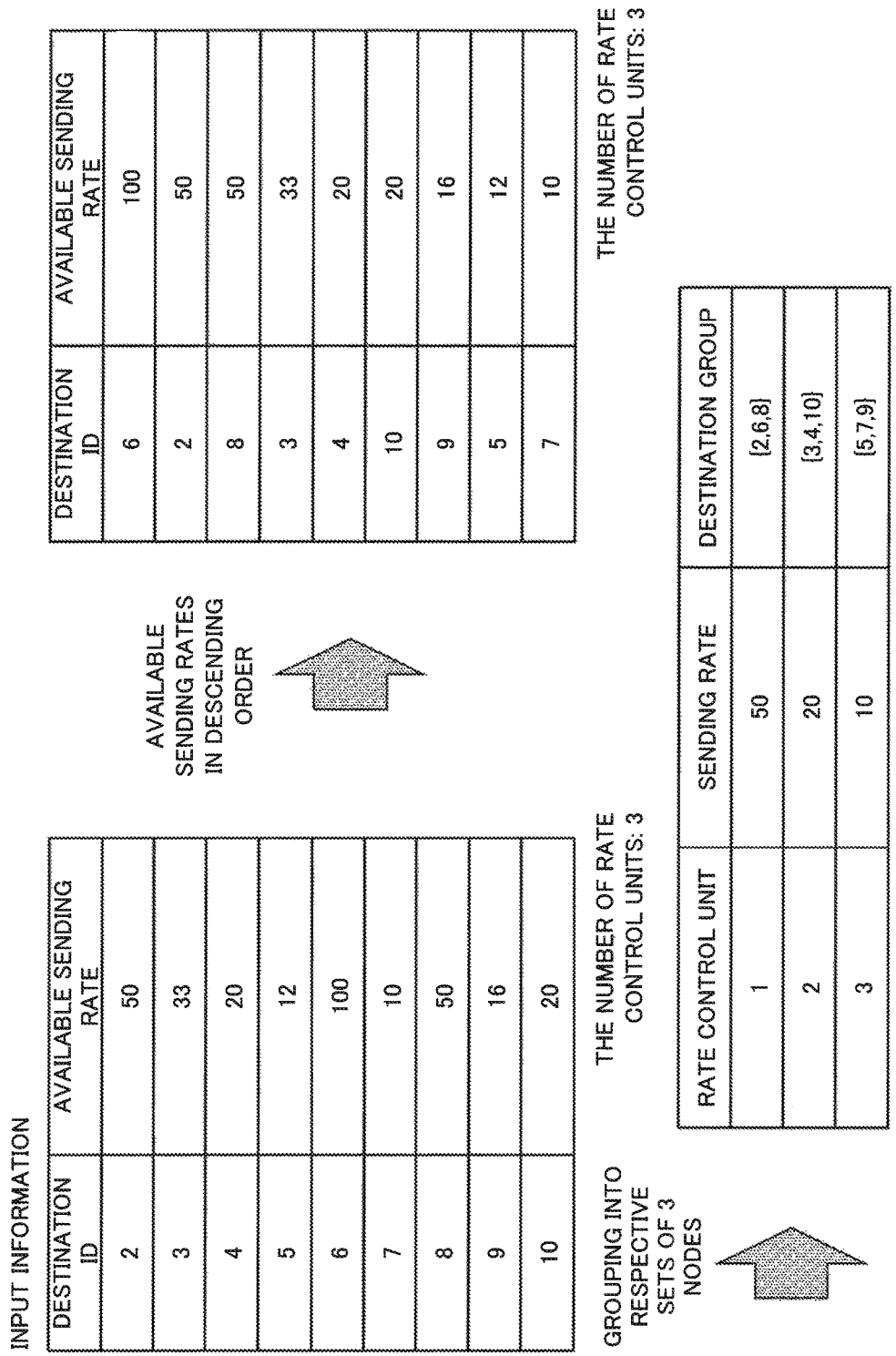
FIG. 13 is a diagram illustrating an example flow of generating input information and distribution rules in the communication system according to the first example embodiment.

When the topology and the numbers of shared flows illustrated in FIG. 12 are known, input information input into the management node 3 will be as illustrated in FIG. 13. Consider a case where the number of rate control units 14 of the NIC 5 of the terminal 1-1 is three (M=3) and only available sending rates are input as input information.

Then, the rule determination unit 20 of the management node 3 generates a distribution rule for each destination for each of the rate control units 14 on the basis of the input information (step D2).

In an example in FIG. 13, first the rule determination unit 20 sorts the available sending rates included in the input information in descending order. Then, since the number of rate control units 14 is three (M=3), the rule determination unit 20 groups the available sending rates into sets of three nodes in ascending order so that the same number of destination IDs are distributed to the rate control units 14. In the example in FIG. 13, destination IDs {2, 6, 8} are distributed to the rate control unit 14-1, destination IDs {3, 4, 10} are distributed to the rate control unit 14-2, and destination IDs {5, 7, 9} are distributed to the rate control unit 14-3. Further, the rule determination unit 20 sets the smallest value among rates at which packets can be sent to the destination IDs in each group as the sending rate for each rate control unit 14.

Setting the sending rate for each rate control unit 14 to the smallest value among the rates at which packets can be sent to the destinations in each group prevents buffer overflow in the NICs 5 during transmission of packets to any destination.

While the rule determination unit 20 of the management node 3 groups destination IDs on the basis of the sending rates at which packets can be sent to other terminals 1 in the present example embodiment, the rule determination unit 20 may also group destination IDs in accordance with algorithm other than the above.

After distribution rules are generated as described above, the rule sending unit 21 of the management node 3 outputs the distribution rules to the distribution rule table 16 in the NIC 5 of each terminal 1 (step D3).

Figure 14:
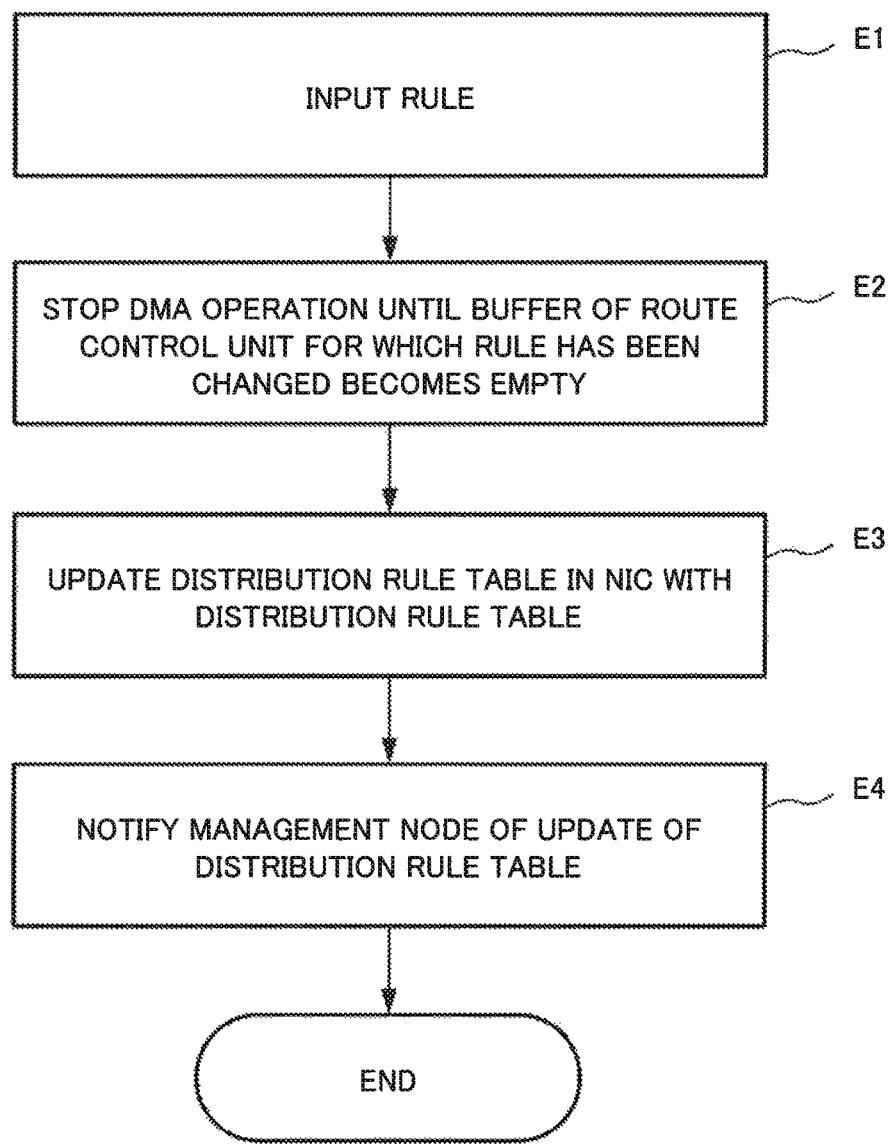
FIG. 14 is a flowchart illustrating an example operation of the destination distribution unit in the communication system according to the first example embodiment when distribution rules are input.

Referring to FIG. 14, when a distribution rule is input into the destination distribution unit 13 in the NIC 5 of a terminal 1 (step E1), the DMA unit 12 stops retrieval of data until the buffer 17 of the rate control unit 14 to which the change has been made becomes empty (step E2).

Then, when the buffer 17 becomes empty, the destination distribution unit 13 updates the distribution rule table 16 in the NIC 5 with the distribution rule and starts a DMA operation via the destination distribution unit 13 (step E3).

Upon completion of the updating of the distribution rule table 16 with the distribution rule, the destination distribution unit 13 notifies the management node 3 of the completion (step E4).

[Advantageous Effects]

Advantageous effects of the communication system according to the present invention will be described next.

The communication system of the present example embodiment eliminates the need for holding a rate control unit 14 for each destination ID of data generated by a terminal 1 and therefore can reduce the hardware (HW) size. This is because the destination distribution unit 13 determines which rate control unit 14 is to be used for pieces of data destined for a plurality of destination IDs and distributes the data to the rate control unit 14, so that the single rate control unit 14 can be shared among the pieces of data destined for the plurality of destination IDs.

Further, the communication system according to the present example embodiment makes HoL Blocking in the terminal 1 less likely to occur. The reasons are as follows. Since a plurality of rate control units 14 are used instead of only a single rate control unit 14, an implementation that reduces the possibility of HoL Blocking is possible. In addition, by using the rule determination unit 20 to distribute data destined for destination IDs with available sending rates that are close to one another to the same rate control unit 14, for example, the possibility of HoL Blocking can be minimized in an implementation with a limited number of rate control units 14.

[Example Hardware Configuration]

The units illustrated in FIG. 2 and the like in the example embodiment described above can be implemented by dedicated pieces of hardware (HW) (electronic circuits). At least the parameter input unit 19, the rule determination unit 20, and the rule sending unit 21 may be considered to be a functional (processing) units (software modules) of a software program. However, the units in the figures are depicted as separate configuration blocks for convenience of explanation and various other configurations can be contemplated. An example of such hardware environment will be described with reference to FIG. 15.

Figure 15:
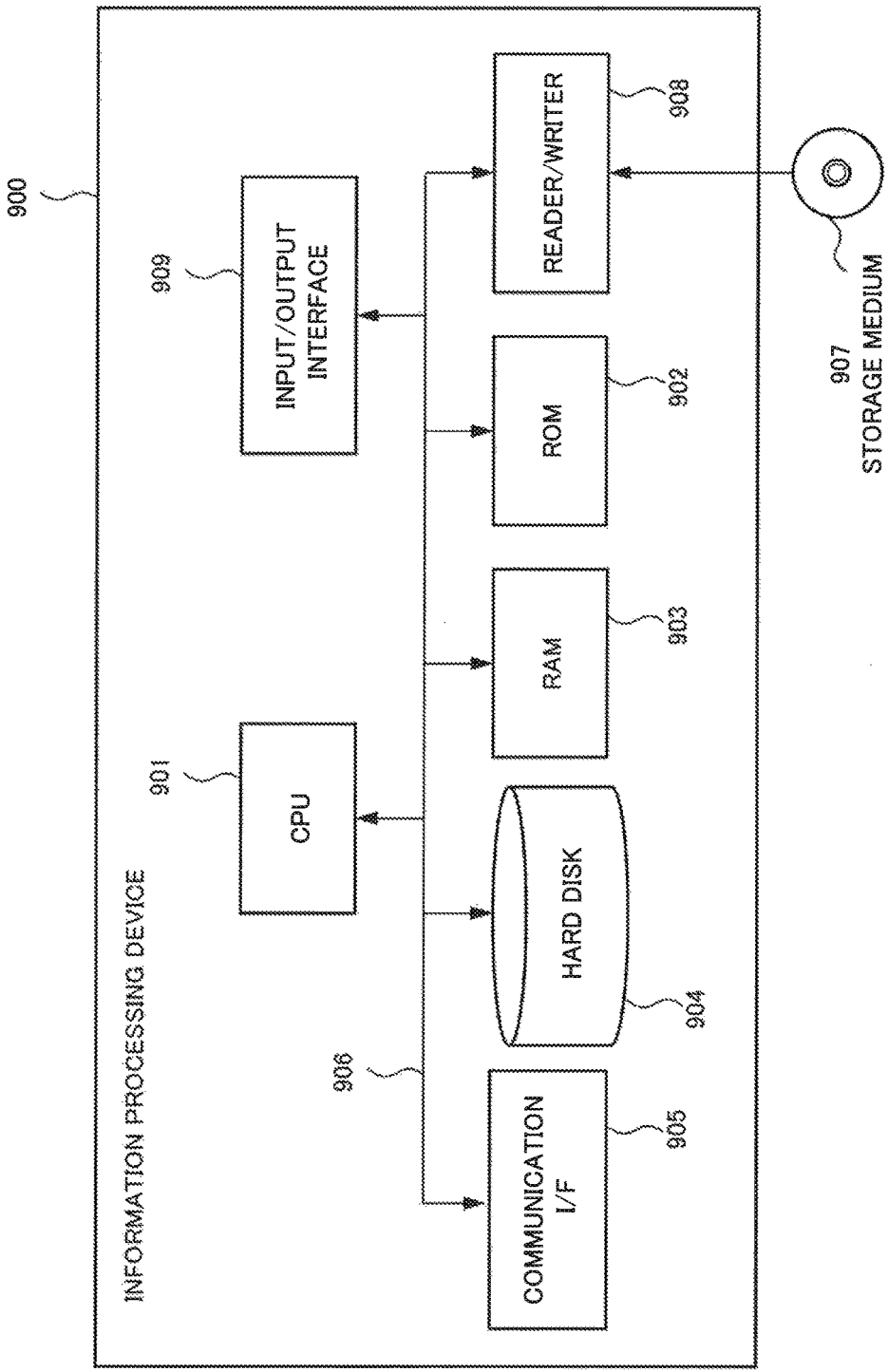
FIG. 15 is a diagram illustrating an example configuration of the management node according to the example embodiment.
Figure 16:
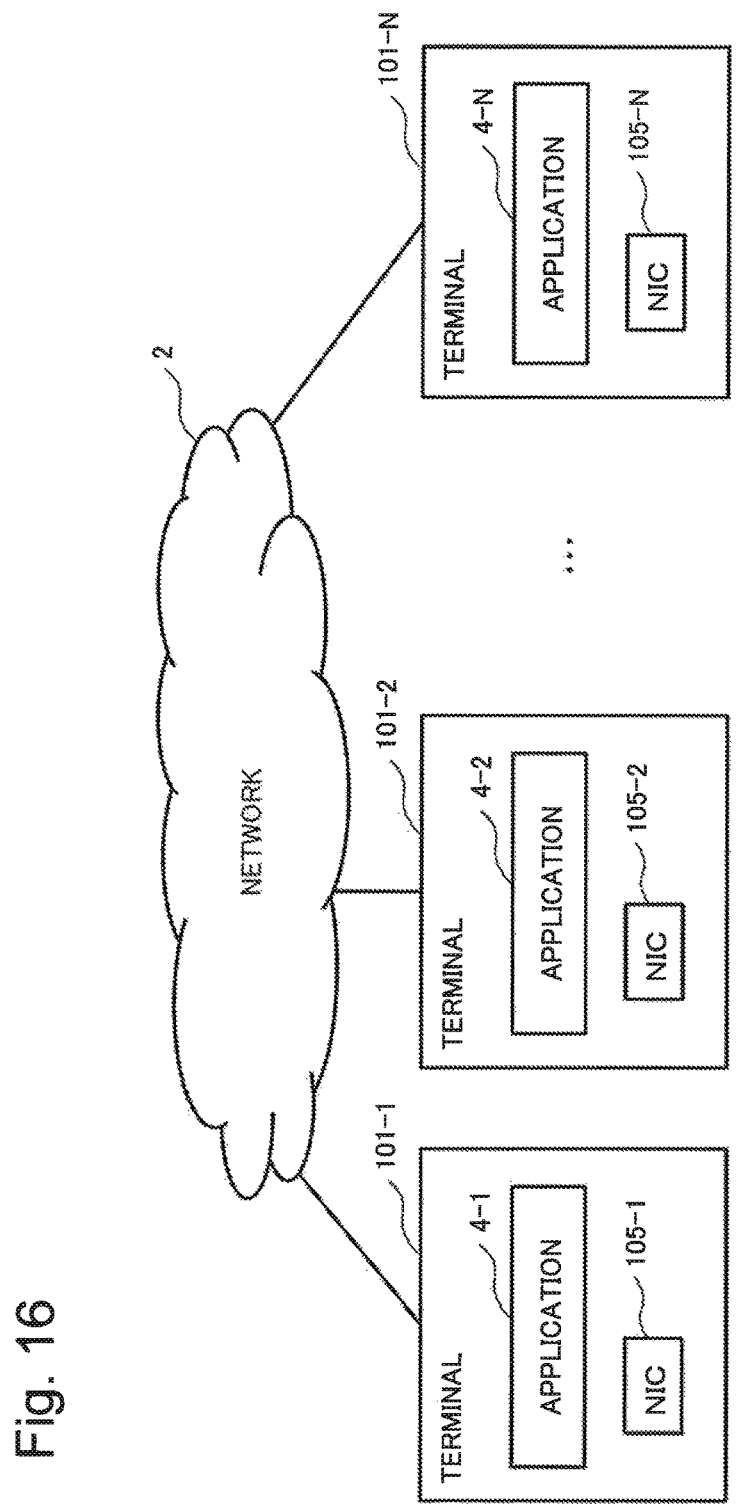
FIG. 16 is a block diagram illustrating an overview for implementing a communication system according to a related art.
Figure 17:
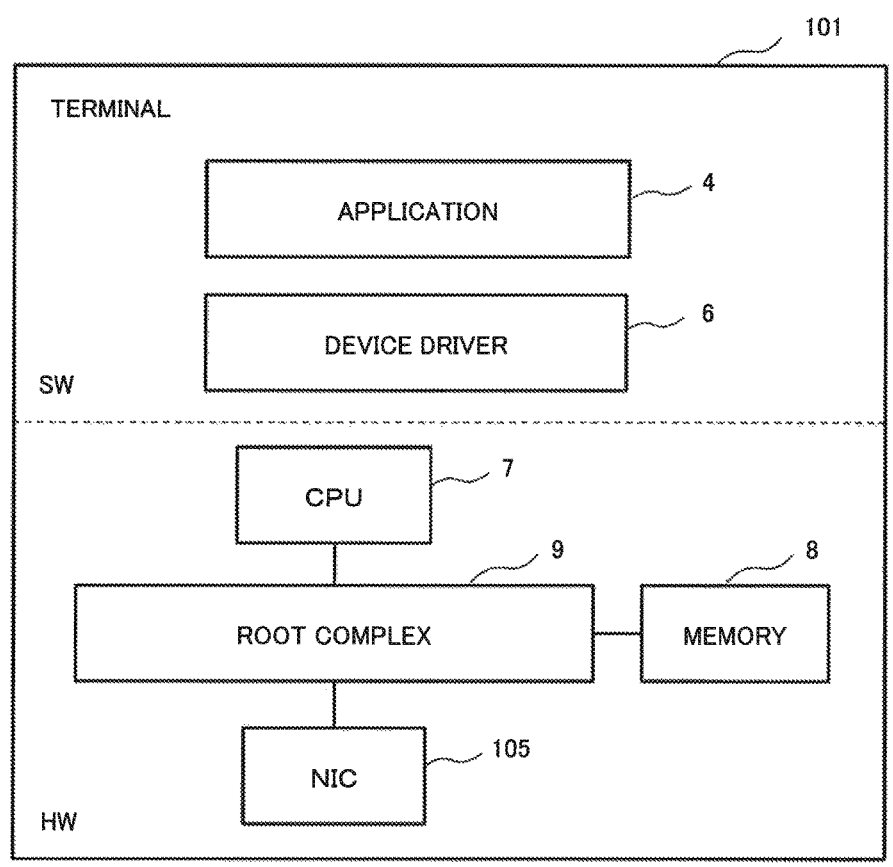
FIG. 17 is a block diagram illustrating a configuration of a terminal in the communication system according to the related art.
Figure 18:
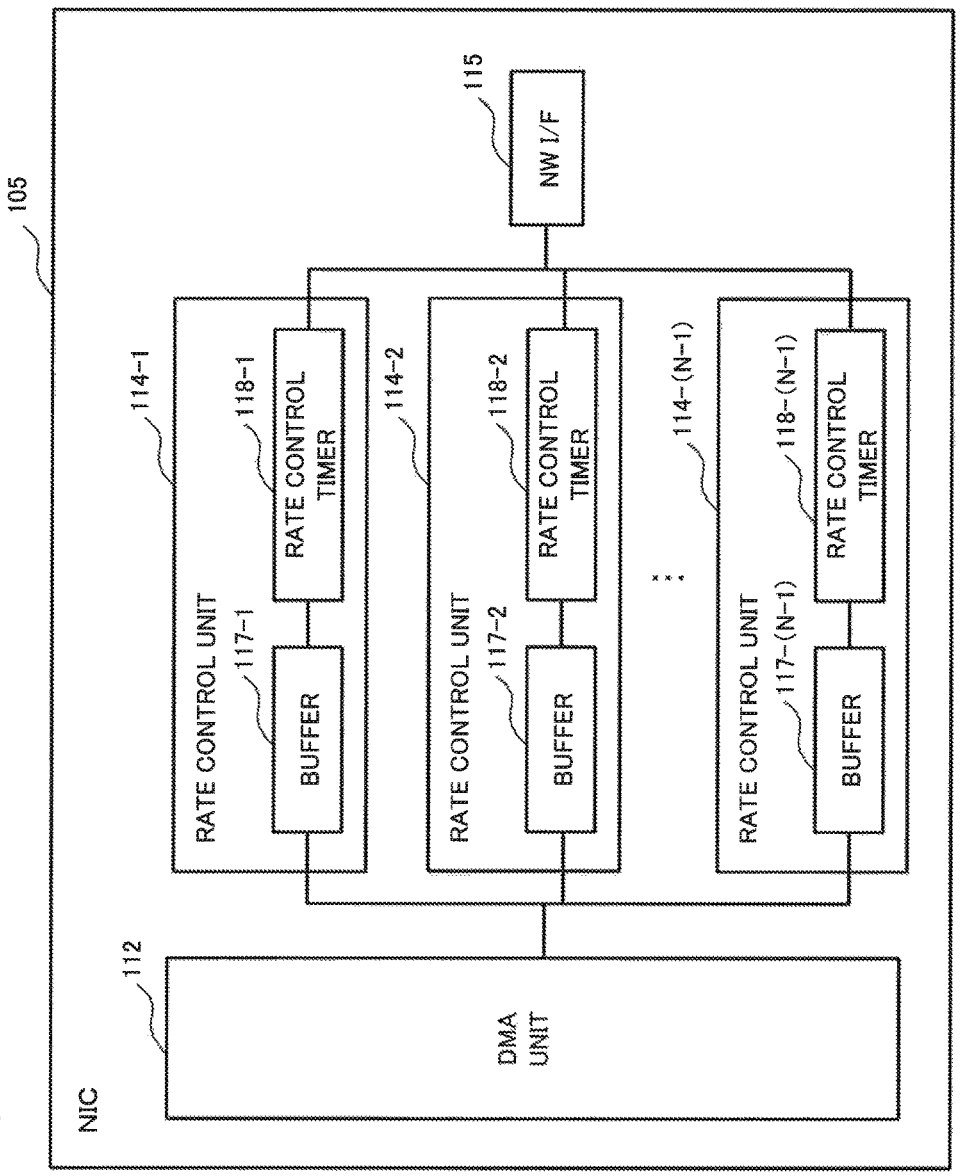
FIG. 18 is a block diagram illustrating a configuration of a network interface card (NIC) in the communication system according to the related art.

FIG. 15 is a diagram illustrating an example configuration of an information processing device 900 (computer) capable of implementing a management node according to a model example embodiment of the present invention. In other words, FIG. 15 illustrates a configuration of a computer (information processing device) that can implement the management node illustrated in FIG. 2 and the like and represents a hardware environment that can implement the functions in the exemplary embodiment described above. Note that the directions of arrows in FIG. 15 are illustrative and are not intended to limit the directions of signals between blocks.

The information processing device 900 illustrated in FIG. 15 includes the following components:

CPU 901,
ROM (Read Only Memory) 902,
RAM (Random Access Memory) 903, Hard disk 904 (storage device)
Communication interface 905 (hereinafter abbreviated as "I/F") to external devices
Reader/writer 908 capable of reading and writing data stored in a storage medium 907 such as a CD-ROM (Compact Disc Read Only Memory), and
Input/output interface 909.

The information processing device 900 is a typical computer in which these components are connected with one another through a bus 906 (a communication line).

The present invention described by taking the above example embodiment as an example provides a computer program that can implement the parameter input unit 19, the rule determination unit 20, and the rule sending unit 21 to the information processing device 900 illustrated in FIG. 15. Then, the present invention is accomplished by reading the computer program into the CPU 901 of the hardware, and interpreting and executing the computer program in the CPU 901. The computer program provided into the device may be stored in a readable/writable volatile storage memory (RAM 903) or a nonvolatile storage device such as a hard disk 904.

In the above case, the computer program may be provided into the hardware by using any of currently common procedures. The procedures may include, for example, a method whereby the computer program is installed in the device through any of various types of storage media 907 such as a CD-ROM, a method whereby the computer program is downloaded from an outside source through a communication network such as the Internet, and the like. In these cases, the present invention can be considered to be implemented by a code constituting the computer program or by a storage medium 907 in which the code is stored.

The following modes are possible in the present invention.

[Mode 1]
A management node according to the first aspect described above.

[Mode 2]
The rule determination unit may determine, based on a number of the plurality of rate control unit, a prescribed rule for associating a packet with any of the plurality of rate control unit in accordance with a destination terminal.

[Mode 3]
The rule determination unit may determine the prescribed rule, based on a topology of a network connected to the NIC provided with a terminal, the topology of the network can include information about a link through which a packet passes when the packet is sent from the terminal to a destination terminal.

[Mode 4]
The rule determination unit may determine the prescribed rule, based on information about a flow of a packet sent from the terminal, and the information about the flow includes information about an available transmission bandwidth for a packet sent from the terminal to a destination terminal.

[Mode 5]
The rule determination unit may classify destination terminals into a plurality of groups in accordance with the available transmission bandwidth and determines a rule for associating each group with any of the plurality of rate control unit as the prescribed rule.

[Mode 6]
The rule determination unit may instruct each rate control unit to control a sending rate of a packet sent to a destination terminal included in a group corresponding to each rate control unit, based on a smallest value of the available transmission bandwidth to the destination terminal included in the group.

[Mode 7]
A terminal according to the second aspect described above.

[Mode 8]
A communication system according to the third aspect described above.

[Mode 9]
In the communication system, a management node may determine, on the basis of the number of the plurality of rate control units, a prescribed rule for associating a packet with any of the plurality of rate control units in accordance with a destination terminal.

[Mode 10]
In the communication system, the management node may determine the prescribed rule on the basis of the topology of a network connected to an NIC provided in a terminal and the network topology may include information about a link through which packets sent from the terminal to a destination terminal pass.

[Mode 11]
In the communication system, the management node may determine the prescribed rule on the basis of information about a flow of packets sent from the terminal and the flow information may include information about an available transmission bandwidth at which packets can be sent from the terminal to a destination terminal.

[Mode 12]
In the communication system, the management node may classify destination terminals into a plurality of groups in accordance with the available transmission bandwidth and may determine as the prescribed rule a rule for associating each of the groups with any of the plurality of rate control units.

[Mode 13]
In the communication system, each of the plurality of rate control units may control a sending rate of packets destined for a destination terminal included in the group associated with the rate control unit on the basis of the smallest value of available transmission bandwidths for sending to the destination terminals included in the group.

[Mode 14]
A communication method according to the fourth aspect.

[Mode 15]
In the communication method, a management node may determine a prescribed rule for associating a packet with any of the plurality of rate control units in accordance with a destination terminal, on the basis of the number of the plurality of rate control units.

[Mode 16]
In the communication method, the management node may determine the prescribed rule on the basis of the topology of a network connected to an NIC provided in a terminal and the network topology may include information about a link through which packets sent from the terminal to a destination terminal pass.

[Mode 17]
In the communication method, the management node may determine the prescribed rule on the basis of information about a flow of packets sent from the terminal and the flow information may include information about an available transmission bandwidth at which packets can be sent from the terminal to a destination terminal.

[Mode 18]

The communication method may include the step of classifying, by the management node, destination terminals into a plurality of groups in accordance with the available transmission bandwidth and may determine as the prescribed rule a rule for associating each of the groups with any of the plurality of rate control units.

[Mode 19]

The communication method may include the step of directing, by the management node, each rate control unit to control the sending rate of packets destined for a destination terminal included in the group associated with each rate control unit on the basis of the smallest value of available transmission bandwidths for sending to the destination terminals included in the group.

[Mode 20]

A communication method in which a terminal provided with a network interface card (NIC) including a plurality of rate control unit for controlling sending rates of packets including a step of receiving a prescribed rule determined by a management node and a step of distributing a packet to any of the plurality of rate control unit in accordance with the received prescribed rule is provided.

[Mode 21]

A program storage medium according to the fifth aspect.

[Mode 22]

The program storage medium may have a program recorded thereon that causes the computer to perform a process of determining a prescribed rule for associating a packet with any of the plurality of rate control units in accordance with a destination terminal, on the basis of the number of the plurality of rate control units.

[Mode 23]

The program storage medium may have a program recorded thereon that causes the computer to perform a process of determining the prescribed rule on the basis of the topology of a network connected to an NIC provided in a terminal and the network topology may include information about a link through which packets sent from the terminal to a destination terminal pass.

[Mode 24]

The program storage medium may have a program recorded thereon that causes the computer to perform a process of determining the prescribed rule on the basis of information about a flow of packets sent from the terminal and the flow information may include information about an available transmission bandwidth at which packets can be sent from the terminal to a destination terminal.

[Mode 25]

The program storage medium may have a program recorded thereon that causes the computer to perform processes of classifying destination terminals into a plurality of groups in accordance with the available transmission bandwidth and determining as the prescribed rule a rule for associating each of the groups with any of the plurality of rate control units.

[Mode 26]

The program storage medium may have a program recorded thereon that causes the computer to perform a process of directing each rate control unit to control the sending rate of packets destined for a destination terminal included in the group associated with each rate control unit on the basis of the smallest value of available transmission bandwidths for sending to the destination terminals included in the group.

[Mode 27]

A program storage medium storing a program causing a computer provided in a terminal provided with a network interface card (NIC) including a plurality of rate control unit for controlling sending rates of packets, to perform the processes of:

receiving a prescribed rule determined by a management node; and distributing a packet to any of the plurality of rate control unit in accordance with the received prescribed rule.

All of the disclosures of the patent literatures cited above are incorporated herein by reference. Changes and adjustments are possible within the scope of the entire disclosure of the present invention (including claims) on the basis of the basic technical idea of the present invention. Further, various combinations or selections of the various disclosed elements (including the elements of the claims, elements of the example embodiments, elements in the drawings, and the like) are possible within the scope of the entire disclosure of the present invention. In other words, it would be understood that the present invention includes various variations and modifications that can be conceived by those skilled in the art in accordance with the entire disclosure, including the claims, and the technical idea. In particular, any numerical values or subranges included within the ranges of numerical values recited herein should be construed as being specifically recited even when each numerical value or subrange is not explicitly recited.

This application is based upon and claims the benefit of priority from Japanese Patent Application No. 2014-246505 filed on Dec. 5, 2014, the entire disclosure of which is incorporated herein.

INDUSTRIAL APPLICABILITY

The present invention is applicable to a management node and the like that distributes packets to terminals provided with an NIC, for example.

REFERENCE SIGNS LIST 1, 1-1 to 1-N, 101, 101-1 to 101-N Terminal
2 Network
3 Management Node
4, 4-1 to 4-N Application
5, 5-1 to 5-N, 105, 105-1 to 105-N NIC
6 Device driver
7 CPU
8 Memory
9 Root complex
10 MEM region
11 DMACTL unit
12, 112 DMA unit
13 Destination distribution unit
14, 14-1 to 14-M, 114-1 to 114-(N-1) Rate control unit
15, 115 NW I/F
16 Distribution rule table
17, 17-1 to 17-M, 117-1 to 117-(N-1) Buffer 1 to N
18, 18-1 to 18-M, 118-1 to 118-(N-1) Rate control timer
19 Parameter input unit
20 Rule determination unit
21 Rule sending unit

What is claimed is:

1. A management node comprising:
a memory storing instructions; and
one or more processors configured to execute the instructions to:

determine a prescribed rule, based on a number of a plurality of rate controllers included in every network interface card (NIC) provided in each of a plurality of terminals as indicated in received input information from each terminal, the prescribed rule for distributing packets to the plurality of rate controllers and for associating a packet with any of the plurality of rate controllers in accordance with a destination terminal; and send the determined prescribed rule to the destination terminal.

2. The management node according to claim 1, wherein the one or more processors are further configured to execute the instructions to:

determine the prescribed rule, based on a topology of a network connected to the NIC, and the topology of the network includes information about a link through which a packet passes when the packet is sent from the terminal to a destination terminal.

3. The management node according to claim 1, wherein the one or more processors are further configured to execute the instructions to:

determine the prescribed rule, based on information about a flow of a packet sent from the terminal, and the information about the flow includes information about an available transmission bandwidth for a packet sent from the terminal to a destination terminal.

4. The management node according to claim 3, wherein the one or more processors are further configured to execute the instructions to:

classify destination terminals into a plurality of groups in accordance with the available transmission bandwidth and determine a rule for associating each group with any of the plurality of rate controller as the prescribed rule.

5. The management node according to claim 4, wherein the one or more processors are further configured to execute the instructions to:

instruct each rate controller to control a sending rate of a packet sent to a destination terminal included in a group corresponding to each rate controller, based on a smallest value of the available transmission bandwidth to the destination terminal included in the group.

6. The management node according to claim 2, wherein the one or more processors are further configured to execute the instructions to:

determine the prescribed rule, based on information about a flow of a packet sent from the terminal, and the information about the flow includes information about an available transmission bandwidth for a packet sent from the terminal to a destination terminal.

7. A method comprising:

determining a prescribed rule, based on a number of a plurality of rate controllers included in every network interface card (NIC) provided in each of a plurality of terminals as indicated in received input information from each terminal, the prescribed rule for distributing packets to the plurality of rate controllers and for associating a packet with any of the plurality of rate controllers in accordance with a destination terminal; and sending the determined prescribed rule to the destination terminal.

8. A non-transitory computer-readable medium storing program code executable by a processor to perform a method comprising:

determining a prescribed rule, based on a number of a plurality of rate controllers included in every network interface card (NIC) provided in each of a plurality of terminals as indicated in received input information from each terminal, the prescribed rule for distributing packets to the plurality of rate controllers and for associating a packet with any of the plurality of rate controllers in accordance with a destination terminal; and sending the determined prescribed rule to the destination terminal.

* * * * *